United States Patent [19] [11] 4,109,864
Clayton [45] Aug. 29, 1978

[54] COOLANT FLOW METERING DEVICE

[75] Inventor: Thomas S. Clayton, Cincinnati, Ohio

[73] Assignee: General Electric Company, Cincinnati, Ohio

[21] Appl. No.: 753,950

[22] Filed: Dec. 23, 1976

[51] Int. Cl.² ............................................. B64D 33/04
[52] U.S. Cl. .................................... 239/127.3; 60/265
[58] Field of Search .............. 239/127.1, 127.3, 132.3, 239/397.5; 60/265, 266

[56] References Cited
U.S. PATENT DOCUMENTS
2,722,801  11/1955  Lombard ........................... 239/127.3

Primary Examiner—Robert W. Saifer
Attorney, Agent, or Firm—Robert C. Lampe, Jr.; Derek P. Lawrence

[57] ABSTRACT

Two overlapping members subject to relative displacement and separated by a gap for spreading a pressurized fluid as a film over the overlapped member are provided with a metering device for providing an essentially constant fluid flow area irrespective of the size of the gap resulting from differences in relative displacement of the members. The metering devices comprise a flexible seal connected to one of the members, the seal being of such a length that it engages in sealing contact the other member under the influence of the pressurized fluid. Orifices of a predetermined size and number formed within the seal provide a generally constant flow area for metering the fluid prior to passage through the gap.

11 Claims, 4 Drawing Figures

COOLANT FLOW METERING DEVICE

BACKGROUND OF THE INVENTION

This invention relates to coolant flow control in fluid-cooled articles and, more particularly, to the control of coolant in film-cooled articles such as gas turbine engine plug nozzles in which the area of the coolant slot is affected by the relative displacement of the various nozzle components due to aerodynamic, thermodynamic and mechanical loadings.

The high temperatures generated in current advanced technology gas turbine engines require that various components be cooled to prevent thermal erosion and fatigue. The cooling problem is particularly challenging in the combustor, turbine and nozzle portions of the engine where temperatures are most severe. While improved high-temperature materials have been developed which can better withstand this environment (turbine inlet temperatures in excess of 2000° F), they must invariably be augmented by some type of fluid-cooling scheme.

Basically, three types of fluid cooling have been developed which are used either singly or in combination depending upon the temperatures encountered and their ease of incorporation. These three types of cooling are commonly referred to as convection, impingement and film cooling, and their use is well understood by those skilled in the art. The present invention is directed to those components which are film cooled by a layer of cooling air which is injected between the high temperature gases and the hot gas side of a flow path defining wall. Generally, the layer of cooling air is formed by directing airflow from a cooling plenum located on the side of the wall opposite the hot gas flow through a series of apertures within the wall. The apertures can take the form of holes from which the air is ejected normal, or near normal, to the hot gas stream. Alteratively, overlapping, telescoping sections of the wall can be arranged to form slots or gaps extending substantially parallel to the wall and from which the cooling air is ejected as a film with less turbulence and mixing than with the more perpendicular holes. While this latter approach to the problem has several aerodynamic advantages, at least one significant drawback has existed. Namely, where two overlapping members are separated by the gap for spreading a cooling air film over the overlapped member, relative thermal displacements of the two members will vary the size of the gap and thus modulate the cooling flow rate, often in an undesirable manner. Additionally, the size of the gap will be affected by aerodynamic and mechanical loadings. This phenomenon is of particular concern in lightweight, sheet metal gas turbine engine exhaust nozzles which experience wide gradients in temperature as the engine power level is modulated.

Various prior approaches to the problem include the use of structural elements to maintain a predetermined gap between the interfacing members through which the controlled amounts of cooling airflow pass. However, these structural elements are subject to thermally induced fatigue due to the cyclic relative displacement of the interfacing members. In another instance, the slot cooling concept was abandoned in favor of several thousand small-diameter, precision-drilled holes which, in essence, provided a porous structure through which the coolant could be aspirated as a film. However, since drilling cooling holes is notoriously expensive, the cooling slot approach is favored and it is desirable to find a device which can meter the flow through the gap between two overlapping members irrespective of the size of the gap as it is affected by the relative displacement of the members.

SUMMARY OF THE INVENTION

Accordingly, it is the primary object of the present invention to provide a device for effectively metering a coolant fluid flow between two overlapping members subject to relative displacement and separated by a gap spreading the fluid as a film over the overlapped member.

It is another object of the present invention to provide such a metering device which is adaptable to the generally annular configuration of a gas turbine engine exhaust nozzle.

These and other objects and advantages will be more clearly understood from the following detailed description, drawings and specific examples, all of which are intended to be typical of rather than in any way limiting on the scope of the present invention.

Briefly stated, in one embodiment the above objectives are accomplished with two overlapping, generally coaxial members of differing diameters which partially define to their radial interior a plenum for receiving the cooling fluid in a pressurized state. A metering device is provided comprising a seal in the form of a ring which is connected at one end to the member of the smaller diameter. The other end of the ring is slotted in the axial direction to form a plurality of generally rectangular flexible fingers of such length as to engage in sealing contact the member having the larger diameter when urged outwardly by the pressurized fluid. A plurality of orifices of generally constant area formed within the ring provide an essentially constant flow area between the plenum and the gap irrespective of the size of the gap as affected by the relative displacement of the members.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

DESCRIPTION OF THE PREFERRED EMBODIMENT

Figure 1:
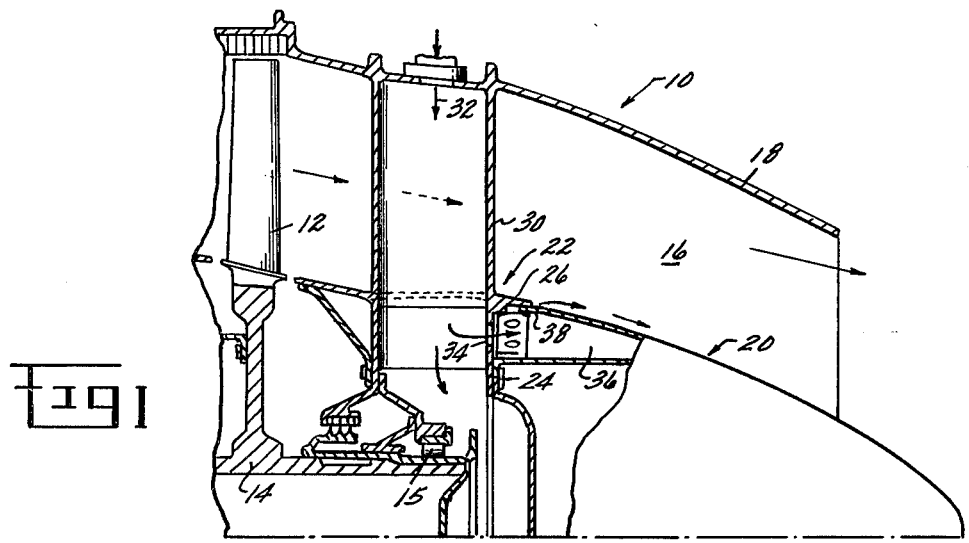
FIG. 1 is a partial cutaway view of a portion of a gas turbine engine exhaust nozzle which incorporates the subject matter of the present invention.

Referring to the drawings wherein like numerals correspond to like elements throughout, attention is first directed to FIG. 1 wherein a gas turbine engine exhaust system depicted generally at 10 and embodying the present invention is diagrammatically shown. Hot gases of combustion are expanded through a turbine 12, rotatably connected to a compressor (not shown)

through shaft 14 and supported for rotation by bearing 15 within frame 22, and enters the exhaust nozzle from the left as viewed in FIG. 1. A propulsive force is obtained by the discharge of the hot gases of combustion from annular passage 16 defined, in part, by wall 18 and generally conical plug 20.

Figures 2, 3:
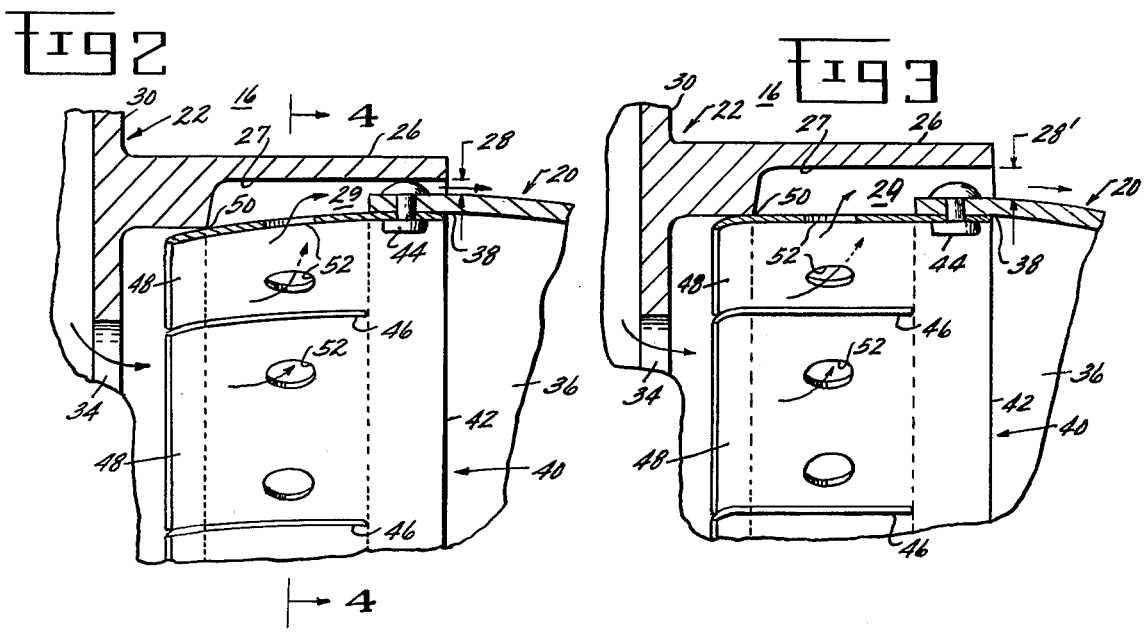
FIG. 2 is an enlarged view of a portion of the nozzle of FIG. 1 depicting the subject invention in greater detail.
FIG. 3 is a view similar to FIG. 2, but depicting the subject invention in a different operating condition.

Conical plug 20 is attached to the turbine structural frame 22 at 24 with the inner flow path of annular passage 16 aft of the turbine frame consisting of a generally cylindrical collar 26 extending rearwardly from frame 22 in overlapping cooperation with plug 20. As is best shown in FIG. 2, collar 26 is undercut at 27 to form a cavity 29 which telescopically receives plug 20. Collar 26 is of a larger diameter than the generally cylindrical portion 38 of plug 20 which it telescopically overlaps, and a rearward-facing gap 28 is provided at the interface therebetween for the ejection of a cooling fluid, typically air, as a film over the plug 20 to provide thermal protection therefor. The pressurized cooling air is bled from the fan or compressor portion of the engine (not shown) and, in the example of FIG. 1, passes through at least one hollow strut 30 of frame 22 as indicated by arrows 32. From this location, the cooling air passes through holes 34 (only one of which is shown for clarity) and enters plenum 36 defined in part, and to the radial interior of, collar 26 and plug 20. The coolant is then ejected from the plenum through gap 28 (FIG. 2) as a cooling film.

As in most exhaust systems where two parts interface and the relative displacements caused by mechanical, aerodynamic and thermal deflections of the two parts are not the same, control of the interface clearances becomes a problem. In this particular case, the turbine frame 22 and collar 26 increase in diameter due to thermal effects much more than the overlapped, generally cylindrical portion 38 of conical plug 20 under normal transient operating conditions. This is due, in part, to the extreme temperatures encountered by the turbine frame while the plug is simultaneously film cooled to a significantly lower temperature. Thus, the size of gap 28 varies greatly over the range of engine operating conditions, producing corresponding changes in the area of the flow annulus created by gap 28. This, if left uncontrolled, may result in an undesirable variation in coolant flow through the range of engine operating conditions.

Figure 4:
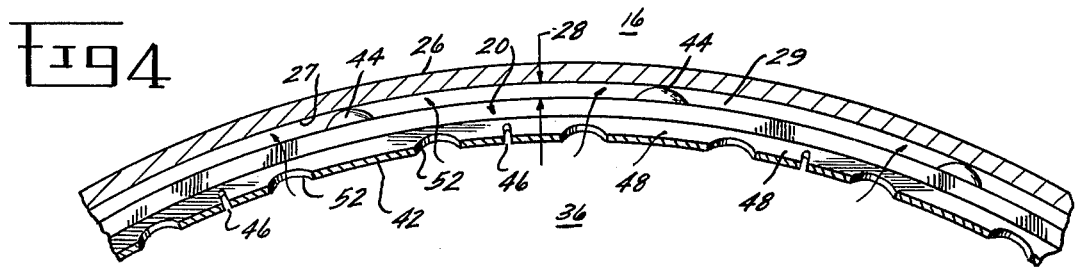
FIG. 4 is a partial cross-sectional view taken along line 4—4 of FIG. 2.

In an attempt to provide a generally constant coolant flow area irrespective of the size of gap 28, a metering device indicated generally at 40 is provided as shown in FIGS. 2-4. This metering device comprises a flexible seal 42 in the form of a ring, one end of which is connected as by rivets 44 to the interior of the overlapped member, cylindrical portion 38 of plug 20. The free end of seal 42 is provided with a plurality of slots 46 to form a plurality of generally rectangular flexible fingers 48. These fingers are of such length that they engage in sealing contact the interior of the larger diameter, overlapping collar 26 at 50 when urged radially outwardly by the pressurized cooling fluid within plenum 36. Preferably, seal 42 should be thin enough to flex but yet thick enough to take the pressure loads of the pressurized fluid. As a result, the flexible fingers 48 are so positioned as to completely seal the plenum 36 and prevent the flow of coolant to gap 28 except for so much of the coolant as can pass through the plurality of thin slots 46 as will be discussed hereinafter.

A plurality of orifices 52 of a desired shape and number are fabricated in seal 42 to provide a means for passing the required amount of coolant flow. Preferably, the sum of the area of orifices 52 is generally less than or equal to the minimum annular area attributed to gap 28, while being of sufficient size to pass the required coolant flow giving due consideration to the driving pressure differential between plenum 36 and passage 16 and the inherent pressure losses throughout the system.

To ensure that gap 28 does not become less than a predetermined minimum size, stand-offs between collar 26 and plug 20 should be provided. As shown in FIGS. 2 and 3, it may be expedient to utilize the inherent thickness of the heads of rivets 44 for this purpose. This also ensures a constant minimum gap size throughout the annulus, something which would be otherwise difficult to obtain due to variations in concentricity of the overlapping members, particularly where they are fabricated of thin sheet metal.

The result is that even under adverse conditions when the diameter of collar 26 expands greater than that of plug 20, as typified by FIG. 3, and the gap 28 increases to a size indicated as 28', flexible fingers 48 of seal 42 are always in contact with the overlapping collar, thereby precluding the flow of coolant around the end of the fingers into cavity 29. Thus, the coolant flow area of orifices 52 is unchanged irrespective of the size of gap 28, thereby providing for a more nearly constant flow rate than if the metering device was removed.

It is apparent that slots 46, even though of narrow width, will pass a measurable amount of coolant flow, and that this amount of flow will vary as the fingers 48 are flexed radially, However, the variation in flow rate through these slots is considerably less than the variation experienced through gap 28 absent the metering device. In fact, in one design the variation in coolant flow rate was reduced from 145% to approximately 30% through incorporation of the subject invention, clearly a significant improvement which measurably benefited the overall engine performance cycle.

It will be obvious to one skilled in the art that certain changes can be made to the above-described invention without departing from the broad inventive concepts thereof. For example, in extremely high temperature applications such as the exhaust nozzle of the present embodiment, seal 42 would preferably be fabricated from a high temperature metal or metallic alloy. However, in some applications, it might be possible to utilize a material which could expand enough such that the need for slots 46 would be eliminated. In such event, orifice means for metering the coolant flow would comprise only apertures 52. Conversely, in other applications it is foreseeable that just the slots 46 would suffice since the area thereof is generally constant with respect to the change in the size of gap 28.

Additionally, the present invention can find application in combustors, augmenters, and any other article which has relative displacements between interfacing, overlapping elements through which controlled amounts of flow pass. Also, the embodiment depicted herein incorporating annular elements is merely illustrative and is not meant to be limiting, as it will become apparent to those skilled in the art that the present invention is equally applicable to generally planar, overlapping elements having a cooling gap therebetween. It is intended that the appended claims cover these and all other variations in the present invention's broader inventive concepts.

Having thus described the invention, what is claimed as novel and desired to be secured by Letters Patent of the United States is:

1. A device for metering a fluid flow between two overlapping members subject to relative displacement and separated by a gap for spreading the fluid as a film over the overlapped member, said metering device comprising a flexible seal having one end which is connected to one of said members with the other end being free, said seal being of such length that said free end will engage in sealing contact with the other of said members when urged outwardly by the fluid, said seal further including orifice means for providing an essentially constant flow area through which the flow passes irrespective of the size of the gap due to differences in relative displacement of said members.

2. The device as recited in claim 1 wherein said overlapping member is undercut to form a fluid cavity therein for partially receiving the overlapped member so as to provide said gap for the passage of the fluid from said cavity as a film over the overlapped member, said members partially defining to their radial interior a plenum for receiving the fluid in a pressurized state and said orifice means providing an essentially constant flow area between said plenum and said cavity.

3. The device as recited in claim 1 wherein said members are generally coaxial and of different diameters, said members partially defining to their radial interior a plenum for receiving the fluid in a pressurized state, and wherein said seal comprises a ring, and orifice means of generally constant area formed within said ring for providing an essentially constant flow area between said plenum and said gap irrespective of the size of the gap due to differences in relative displacement of said members.

4. The device as recited in claim 3 wherein the free end of said ring is slotted in the axial direction to form a plurality of generally rectangular flexible fingers of such length as to engage in sealing contact the other of said members.

5. The device as recited in claim 4 wherein said ring is connected to said overlapped member and wherein said other member comprises said overlapping member.

6. The device as recited in claim 4 wherein said orifice means comprises the slots between flexible fingers.

7. The device as recited in claim 6 wherein said orifice means further comprises a plurality of holes formed within said ring.

8. The device as recited in claim 3 wherein said orifice means comprises a plurality of holes formed within said ring.

9. The device as recited in claim 3 wherein the area of said orifice means is less than or equal to the minimum annular area of said gap.

10. The device as recited in claim 1 wherein said flexible seal is connected to one of said members by connecting means which also serve as standoff means disposed between said elements to maintain at least a minimum gap size therebetween.

11. A device for metering a fluid flow between two generally coaxial members which are of different diameters and located with relation to each other with the member of the smaller diameter projecting for a portion of its length into the member of the larger diameter so as to provide an annular gap between the members for the passage of a fluid as a film over the member of the smaller diameter, said members partially defining to their radial interior a plenum for receiving the fluid in a pressurized state, said metering device comprising a ring, one end of which is connected to the interior of the member of the smaller diameter and the other end of which is slotted in the axial direction to form a plurality of generally rectangular flexible fingers of such length as to engage in sealing contact the member of the larger diameter when urged radially outwardly by the pressurized fluid, and a plurality of orifices of generally constant area formed within said ring for providing as essentially constant flow area between said plenum and said gap irrespective of the size of the gap due to differences in relative displacement of said members.

* * * * *